United States Patent
Janakiraman et al.

(10) Patent No.: US 8,477,621 B2
(45) Date of Patent: Jul. 2, 2013

(54) MULTIPLE PROTOCOL CORRELATION AND TOPOLOGY DETECTION IN EHRPD NETWORKS

(75) Inventors: Vignesh Janakiraman, Plano, TX (US); Antonio Bovo, Padua (IT)

(73) Assignee: Tektronic, Inc., Plano, TX (US)

( * ) Notice: Subject to any disclaimer, the term of this patent is extended or adjusted under 35 U.S.C. 154(b) by 189 days.

(21) Appl. No.: 13/114,934

(22) Filed: May 24, 2011

(65) Prior Publication Data

US 2012/0300639 A1    Nov. 29, 2012

(51) Int. Cl.
*G01R 31/08* (2006.01)

(52) U.S. Cl.
USPC ............................ 370/235; 370/252; 370/329

(58) Field of Classification Search
CPC ....... H04W 80/04; H04W 36/18; H04W 76/02; H04L 47/14; H04L 47/10
See application file for complete search history.

(56) References Cited

U.S. PATENT DOCUMENTS

| | | | |
|---|---|---|---|
| 2007/0060067 A1* | 3/2007 | Ruuska | 455/67.11 |
| 2010/0303238 A1* | 12/2010 | Cakulev et al. | 380/272 |
| 2010/0322163 A1* | 12/2010 | Bhalla et al. | 370/329 |
| 2012/0172036 A1* | 7/2012 | Bhalla | 455/432.1 |
| 2012/0307802 A1* | 12/2012 | Bhalla et al. | 370/331 |

FOREIGN PATENT DOCUMENTS

| EP | 1 717 993 A1 | 11/2006 |
|---|---|---|
| EP | 1 976 188 A2 | 10/2008 |

OTHER PUBLICATIONS

European Patent Office, "partial European Search Report," EPO Application No. 12168454.2, Sep. 6, 2012, (6 pages).
3GPP2, "E-UTRAN—eHRPD Connectivity and Interworking: Core Network Aspects," 3GPP2 X.S0057-0, Version 1,0, Apr. 2009, (154 pages).
3GPP2, Interoperability Specification (IOS) for Evolved High Rate Packet Data (eHRPD) Radio Access Network Interfaces and Interworking with Enhanced Universal Terrestrial Radio Access Network (E-UTRAN), 3GPP2 A.20022-0, V1.0, Mar. 2009, (193 pages).

* cited by examiner

*Primary Examiner* — Jung Park
(74) *Attorney, Agent, or Firm* — Edwards Wildman Palmer LLP; Scott D. Wofsy; Christopher J. Capelli

(57) ABSTRACT

Network nodes and interfaces are identified in a combined CDMA/eHRPD and LTE network. Messages captured by a monitoring system on different interfaces are combined in session records. The session records associated with the same network nodes correlated using parameters in the session records. Session records on an A11, A10 and S2a interfaces are correlated using a home network prefix and interface identifier data or home address information.

17 Claims, 5 Drawing Sheets

MULTIPLE PROTOCOL CORRELATION AND TOPOLOGY DETECTION IN EHRPD NETWORKS

TECHNICAL FIELD

Embodiments are directed, in general, to detecting and identifying the topology of combined eHRPD and LTE networks and, more specifically, to correlating session records for different protocols.

BACKGROUND

Wireless networks have evolved over the past decade to provide extensive mobile data and mobile Internet services. Subscribers routinely use their mobile devices to access streaming audio and video, read and send electronic mail, and browse the Internet. To support the increasing use of data and multimedia services, service providers must continually evolve their networks. As mobile data continues to expand, many service providers are moving toward next generation networks, such as Long Term Evolution (LTE) networks. LTE is a 3GPP mobile specification that is designed to provide multi-megabit data rates, efficient radio networks, reduced latency, and improved mobility.

Traditionally, mobile networks have primarily followed two standards-based technologies—GERAN/UMTS and CDMA. GERAN/UMTS-based networks provide a natural evolution to LTE. Many CDMA-based network operators have also decided to evolve toward the LTE specification. Those CDMA operators have evolved their networks to support "evolved High Rate Packet Data" (eHRPD) as a step on the migration path toward LTE. eHRPD allows mobile operators to upgrade existing HRPD packet core networks and integrating them with elements of the Evolved Packet Core (EPC) architecture. eHRPD allows for seamless service mobility and handoffs between the eHRPD and LTE networks.

CDMA operators are undergoing a phased migration in which existing HRPD networks evolve to eHRPD on the way to becoming LTE networks. To introduce eHRPD, a HRPD Serving Gateway (HSGW) is added to the CDMA network. The HSGW also allows the inter-working between eHRPD and EPC. The HSGW supports the connection to S-GW and PDN-GW, ensuring the mobility management between eHRPD and LTE networks so that subscribers experience seamless handover without dropping sessions and with reduced latency.

SUMMARY

A network monitoring system identifies the network topology of a CDMA/eHRPD network. The monitoring system also identifies network interfaces that connect the CDMA/eHRPD network with an LTE network. More specifically, the monitoring system detects CDMA-specific interfaces, such as the A11, A10, A13, A24 and H1 interface, and detects shared eHRPD/LTE interfaces, such as the S2a, S101 and S103 interfaces. This allows the monitoring system to provide both a CDMA network topology and a unified CDMA/LTE topology to the network operator.

Other embodiments of the monitoring system use a scheme for multi-protocol correlation between A10/A11 interfaces and S2a interfaces in the eHRPD network. This scheme allows the monitoring system to perform multi-protocol correlation on the interfaces without using the International Mobile Subscriber Identity (IMSI) parameter, which may vary for a single UE.

BRIEF DESCRIPTION OF THE DRAWINGS

Figure 1:
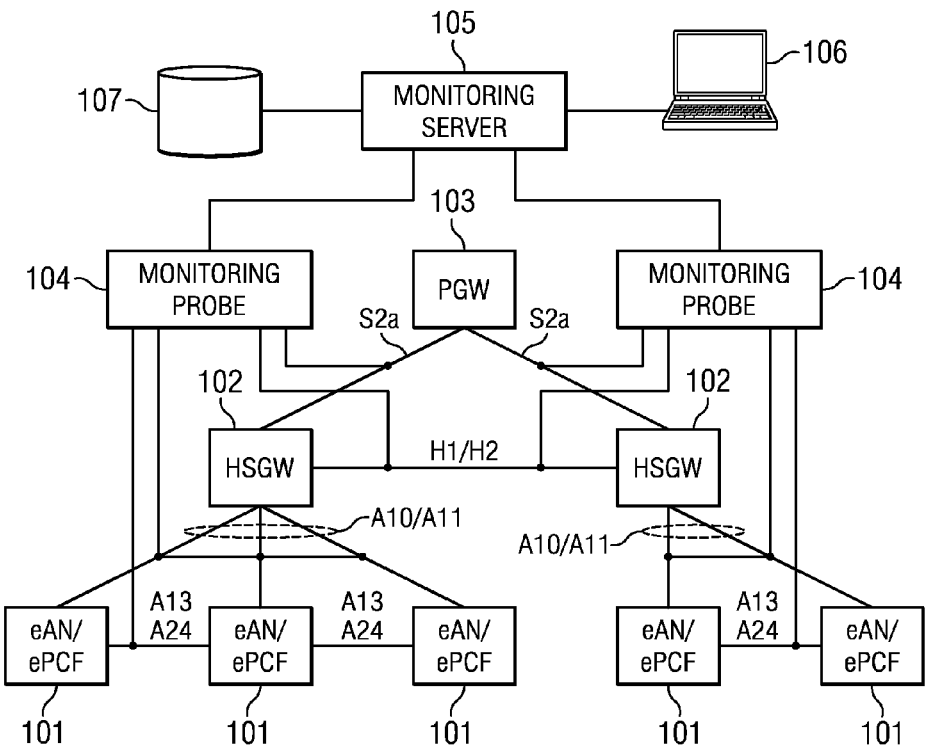
Figure 2:
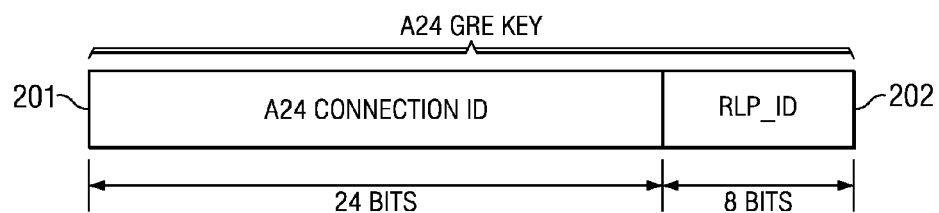
Figure 3:
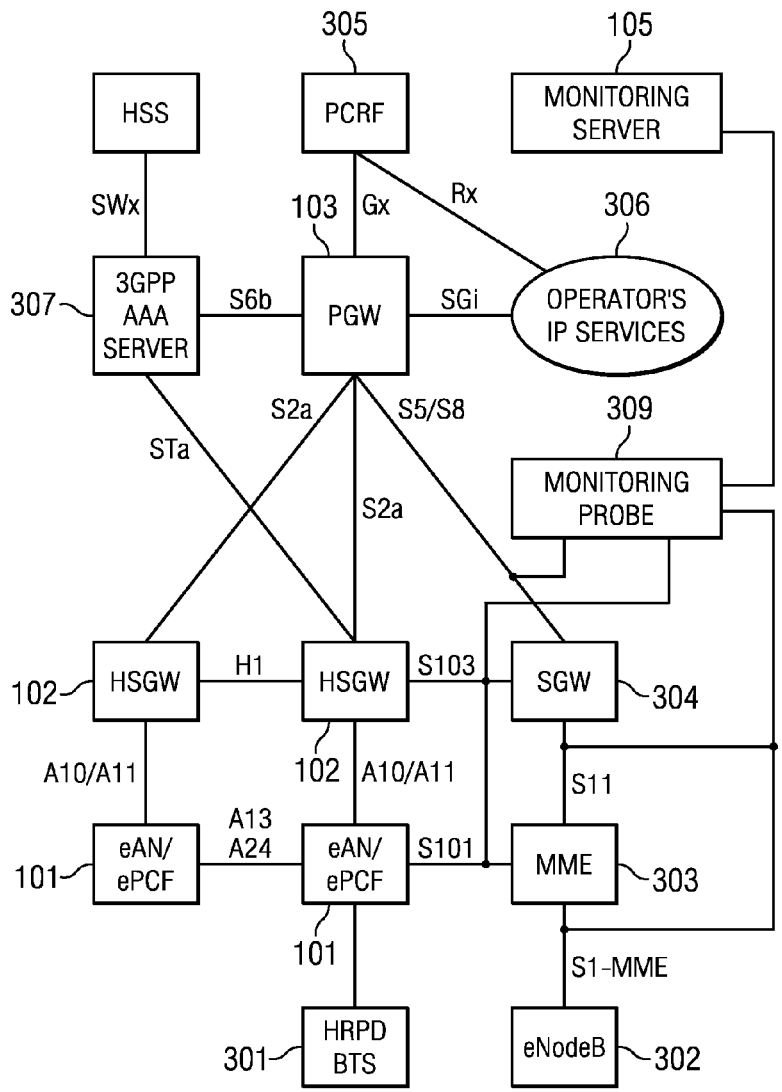
Figure 4:
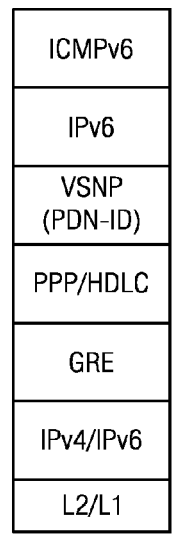
Figure 5:
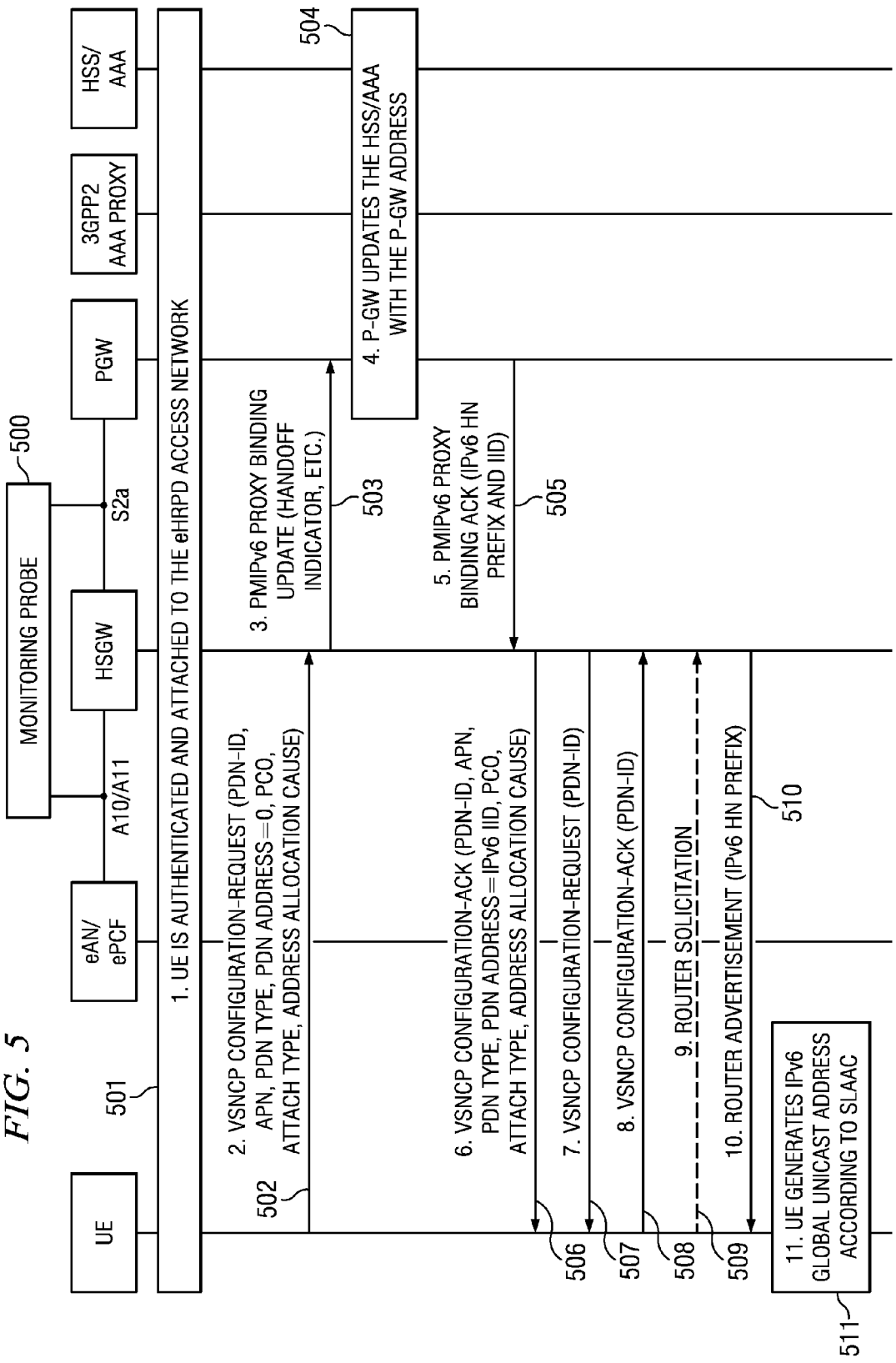
Figure 6:
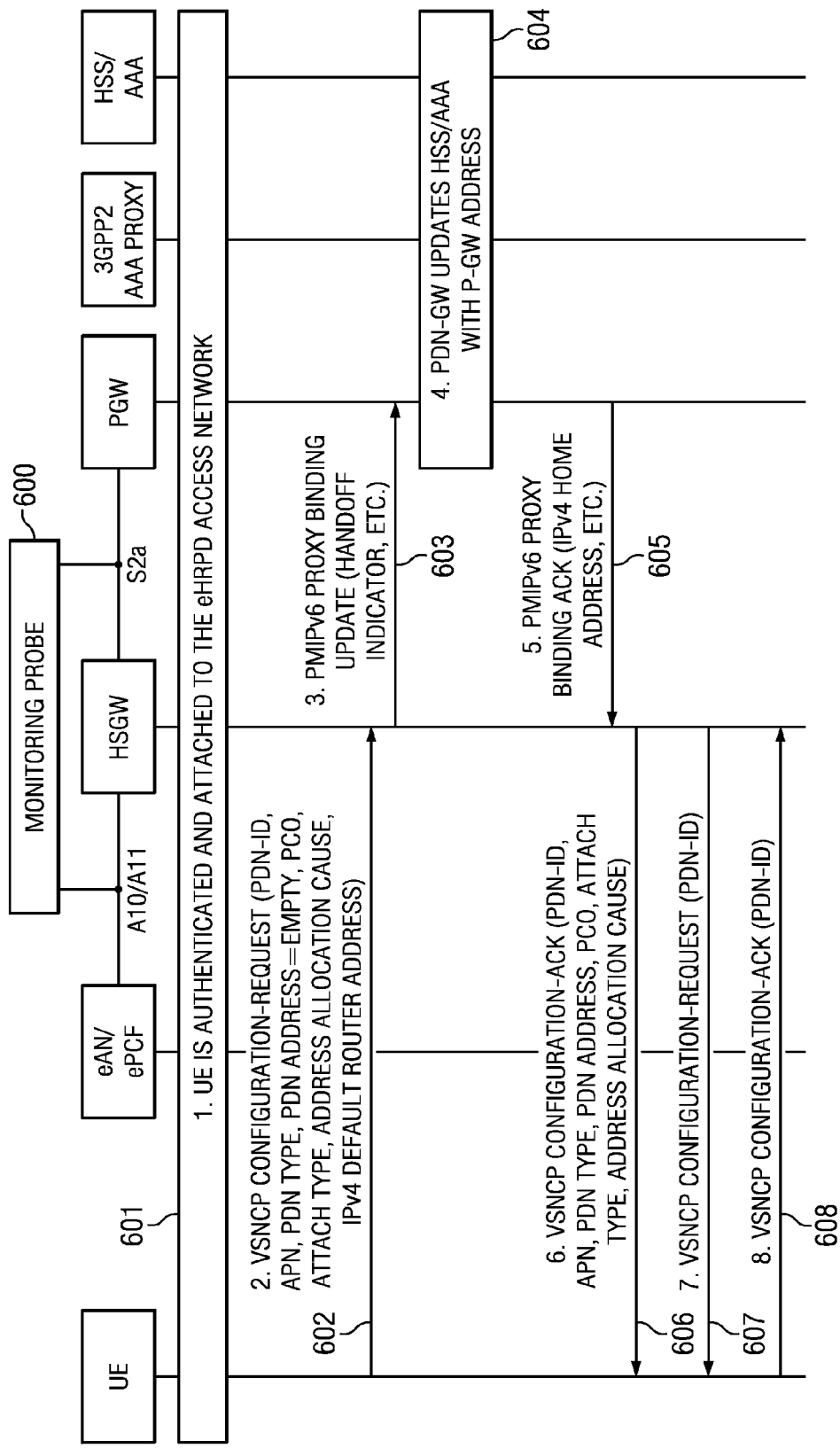
Figure 7:
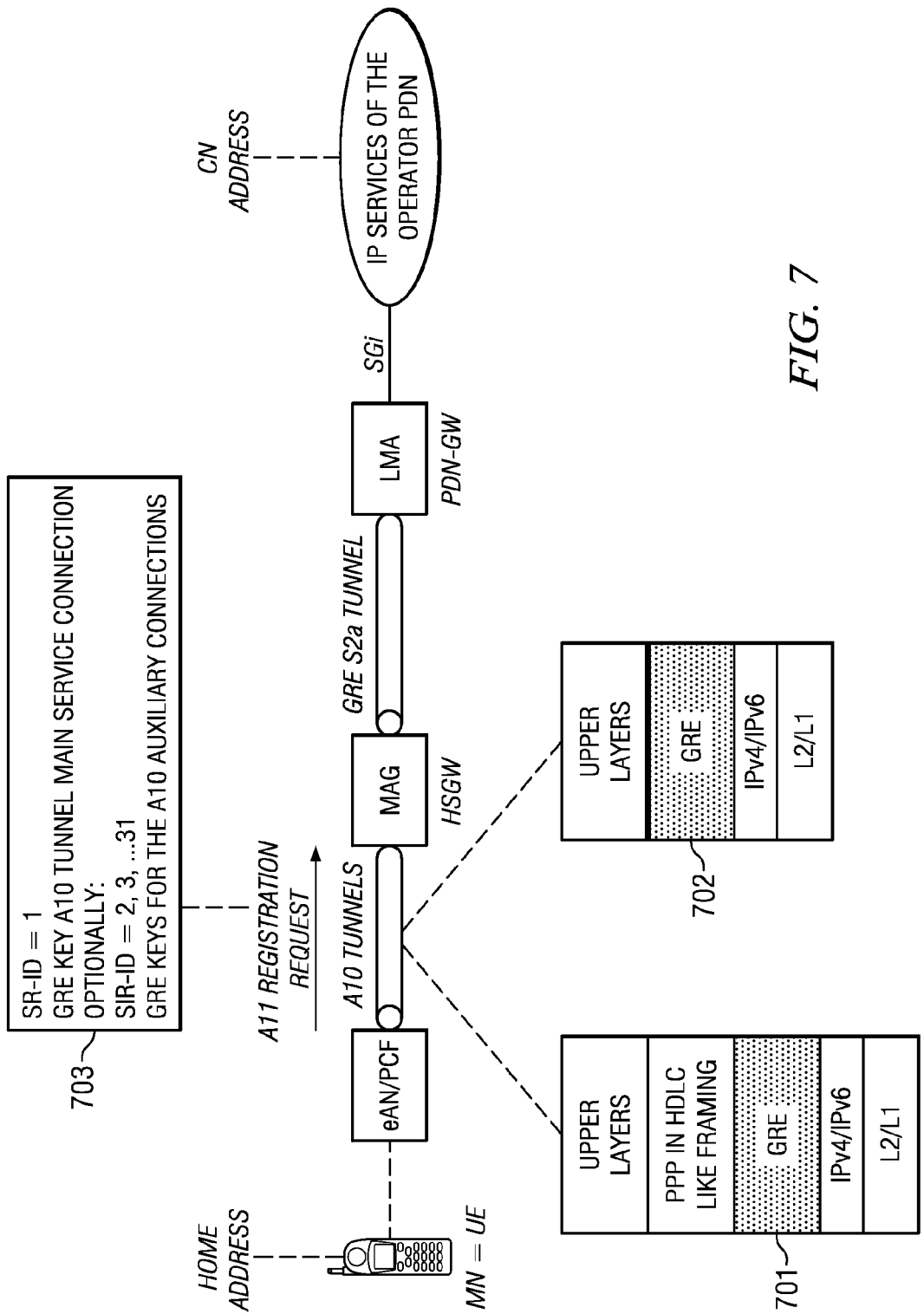

Having thus described the invention in general terms, reference will now be made to the accompanying drawings, wherein:

FIG. 1 is a block diagram of an eHRPD network;

FIG. 2 illustrates the A24 Connection ID and RLP_ID components of the A24 GRE Key;

FIG. 3 illustrates a combined eHRPD/LTE network that includes eHRPD elements and LTE nodes;

FIG. 4 illustrates the ICMPv6 stack in A10;

FIG. 5 illustrates a call flow representing an IPv6 allocation;

FIG. 6 is a flowchart illustrating IPv4 address allocation during PDN connection establishment; and FIG. 7 illustrates A10 stacks for a Main Service Connection and Auxiliary Service Connections.

DETAILED DESCRIPTION

The invention now will be described more fully hereinafter with reference to the accompanying drawings. The invention may, however, be embodied in many different forms and should not be construed as limited to the embodiments set forth herein. Rather, these embodiments and examples are provided so that this disclosure will be thorough and complete, and will fully convey the scope of the invention to those skilled in the art. One skilled in the art may be able to use the various embodiments of the invention.

eHRPD Network Nodes and Interfaces

FIG. 1 is a block diagram of an eHRPD network 100. The eHRPD network includes many evolved Packet Control Function (ePCF) nodes. The ePCFs are interfaced with the evolved Access Network (eAN) 101, which provide User Equipment (UE) access to eHRPD network 100. The eAN and the ePCF can be physically combined into the same node 101 as illustrated in FIG. 1. The eAN/ePCF nodes 101 communicate with each other via the A13 and A24 interfaces. Each of the eAN/ePCF nodes 101 are connected to a HRPD Serving Gateway (HSGW) 102. A single HSGW 102 serves multiple eAN/ePCF nodes 101 via the A10/A11 interfaces. The HSGWs 102 communicate with each other via the H1/H2 interfaces. The HSGWs 102 are coupled to a Packet Data Network (PDN) Gateway (PGW or PDN-GW) 103 via S2a interfaces.

In one embodiment, the network operator uses a monitoring system that is independent from the eHRPD network 100 to control the network and to monitor its current network status and activity. The monitoring system may include a plurality of monitoring probes 104 that are coupled to one or more network interfaces. The monitoring probes passively capture messages, data packets, or protocol data units (PDU) from the interfaces without interfering with the operation of network 100. The monitoring probes process the captured data immediately and/or pass the data to a central monitoring server 105. The captured data may be correlated and processed in monitoring server 105 and information regarding the current status of the network extracted from the data. A network operator may access this information using workstation 106. Captured data may be stored by the monitoring system in database 107.

A11 Interface

The A11 interface carries signaling information between the eAN/ePCF 101 and HSGW 102. Multiple eAN/ePCFs 101 are connected to the same HSGW 102. A11 is a control plane interface that transports the signaling for managing the ePCF-HSGW connections. The A11 interface supports UE mobility for handover between two eAN/ePCFs 101 that are controlled by the same HSGW 102. In one embodiment, detection of the A11 interface and the eAN/ePCF 101 nodes may be accomplished using the following procedure.

The A11 Registration Request message is sent from the eAN/ePCF 101 to the HSGW 102 to setup an A10 connection. The A11 Registration Request messages are captured by the monitoring probes 104 from the A11 interfaces. The Source IP address in the A11 Registration Request identifies the eAN/ePCF 101 that sent the message. The "Care of Address" element in the A11 Registration Request identifies the eAN/ePCF 101 that terminates the A10 connection. The frame section "Normal Vendor/Organization Specific Extension (NVSE)" of the A11 Registration Request may carry the Generic Routing Encapsulation (GRE) Keys. The monitoring system extracts the IP addresses from the Source IP address, Care of Address element, and GRE Key entries and associates those IP addresses with the same ePCF node.

The A11 Registration Reply message is sent from the HSGW 102 to an ePCF 101. The Source IP address in an A11 Registration Reply message identifies the HSGW node that sent the message. The "Home Agent" Address in the A11 Registration Reply message is the IP address for the HSGW 102. The frame section NVSE of the A11 Registration Reply may include the GRE Keys. The monitoring system extracts the IP address present in the Source IP address, Home Agent Address and GRE Key entries and associates those IP addresses with the same HSGW node.

A10 Interface

The A10 interface is a user plane interface that transports the UE payload and certain control plane signaling, which is used to configure the user plane services. The A10 interface is between ePCF 101 and HSGW 102. The A10 traffic is tunneled on GRE. These GRE tunnels are setup using the A11 signaling (A11 Registration Request/A11 Registration Reply) described above. The IP addresses for the A10 endpoints can be identified from the NVSE of the A11 Registration Request/Reply messages.

Dormant and Fast Handoffs

A single HSGW 102 may have multiple IP addresses. For example, the IP addresses used by HSGW 102 may be different for each ePCF to which the HSGW is connected. In such a case, specific detection logic is necessary to merge the HSGW IP addresses that are connected to different ePCFs 101 into a single HSGW node 102.

In the scenario of inter-ePCF handoff within the same HSGW, it is possible to bind the IP addresses of the source and target A11 connection to the same HSGW. Firstly, by monitoring the A11 Registration Request message and checking for the presence of the "Mobility Event" indicator, the algorithm identifies a mobility event, which may be either intra-HSGW or inter-HSGW. Secondly, checking for the absence of the "HSGW H1 address information" parameter from the same message, it is possible to determine that the A11 Registration Request message belongs to the target side of an intra-HSGW mobility scenario. The correlation of the source path with the target path by means of UE-related identifiers (e.g. the MSID/IMSI) allows binding of the source and target IP addresses to the same HSGW node entity.

In the scenario of inter-ePCF handoff within the same HSGW, it is possible to bind the IP addresses of the source and target A11 connection to the same HSGW. Firstly, by monitoring the A11 Registration Request message and checking the presence of the "Mobility Event" indicator, the algorithm assures a mobility event, either intra-HSGW or inter-HSGW. Secondly, checking the absence of the "HSGW H1 address information" parameter from the same message it is possible to state that the A11 Registration Request message belongs to the target side of an intra-HSGW mobility scenario. The correlation of the source path with the target path by means of UE-related identifiers (e.g. the IMSI) allows binding the source and target HSGW IP addresses to the same HSGW node entity.

H1 Interface

The H1 interface carries signaling information between the HSGWs 102 and is used to optimize inter-HSGW transfer of UEs. It is possible to detect the H1 IP address of the HSGW 102 from the A11 interface signaling. This eliminates the need to perform H1 interface analysis. The H1 IP address for an HSGW 102 is conveyed in a separate information element in the A11 Registration Reply message. This H1 IP address, if detected, may be combined with the HSGW IP addresses already detected above.

A13 Interface

The A13 interface carries signaling information between ePCFs 101 and is used for inter-ePCF handovers. The ePCFs 101 are each associated with an enhanced Access Network (eAN) and the A13 signaling may also be used for inter-eAN handovers. The monitoring probes 104 may capture the A13 Session Information Response message, which contains an HSGW IP address. The eHRPD scenario is identified by checking the A13 eHRPD Indicators in the Session Information Request message and the Protocol Type in the Session State Information Record (SSIR) and Extended Session State Information Record (ESSIR) in the Session Information Response messages. When present, this IPv4 address allows a target ePCF 101 to connect back to the same HSGW 102 without executing a HSGW re-selection algorithm. In the case of dormant inter-ePCF handoff, the target ePCF 101 may use the HSGW IP address that is received from the source ePCF 101 to send the A11 Registration Request message. Hence, by correlating the A13 and A11 signaling, it is possible to bind the same HSGW 102 that is connected to multiple ePCFs 101.

A24 Interface

The A24 interface is used to send buffered data from a source ePCF 101 (or eAN) to a target ePCF 101 (or eAN) in the case of a session transfer via A13. The A24 interface is GRE-based. The GRE tunnels are defined via the A13 signaling messages, such as Session Information Request/Response messages. As illustrated in FIG. 2, by tracking the A13 messages and extracting the A24 connection ID 201 from the Session Information Request messages and the RLP_ID 202 from the Session Information Response messages, it is possible to derive the complete A24 GRE Key 200 by appending these values together. Using the GRE Key 200, the IP addresses of the ePCF nodes 101 for the A24 interface can be correlated with the A13 interfaces.

S2a Interface

The S2a interface is defined between a trusted non-3GPP access network and PGW 103. In the case of the eHRPD network, the trusted non-3GPP access network is HSGW 102. The S2a interface provides user plane tunneling and tunnel management between HSGW 102 and PGW 103. The S2a interface also provides mobility support within the eHRPD network, such as HSGW mobility, and mobility between the eHRPD and the LTE networks. The protocol over the S2a interface is based on Proxy Mobile IPv6 (PMIPv6).

HSGW 102 acts as a Mobile Access Gateway (MAG) and the PGW 103 acts as Local Mobility Anchor (LMA).

The Proxy Binding Update/Proxy Binding Ack (PBU/PBA) procedure on the S2a interface may be monitored by a monitoring probe 104. The source IP address of the PBU message may be extracted and associated with HSGW 102. The source IP address of the PBA message may be extracted and associated with PGW 103. However, in order to merge the records for an HSGW on the S2a interface and an HSGW on the A11 interface, a scheme is necessary. The dynamic PDN address assigned on PMIPv6 to the UE and present in the PBA must be bound with the same value monitored on the Vendor-Specific Network Control Protocol (VSNCP) and the Internet Control Message Protocol (ICMP) over A10 (IPv6 Home Network Prefix+Interface ID (IID) or IPv4 Home Address).

In another embodiment, the IP addresses and nodes associated with the S2a interface are identified by monitoring the handover from LTE to eHRPD. In this case, the A11 Registration Request message contains a "PDN Information Entry" information element. This element contains the Access Point Name (APN) and the PGW IP address for each PDN entry that is being handed off. In case of handover from eHRPD to LTE, the A11 Registration Response message contains another "PDN Information Entry" information element. This element also contains the APN and the PGW IP address for each PDN entry that is being handed off. By monitoring these A11 Registration Registration/Response messages and extracting the PDN Information Entry information elements, it is possible to bind the A11 HSGW 102 with the PGW node 103 using the PGW IP address. Next, by matching the PGW IP address in the destination IP address of the PBU message, the source IP address of the PBU may then associated with a particular HSGW.

LTE Network Nodes and Interfaces

As CDMA/eHRPD service providers expand their networks, LTE nodes can be added to the network to provide 4G services. The LTE nodes may be interconnected with the eHRPD nodes, thereby avoiding the problem of having a separate overlaid LTE network. FIG. 3 illustrates a combined eHRPD/LTE network 300, which includes the eHRPD elements of network 100 (FIG. 1) and new LTE nodes. Nodes and interfaces that are common between networks 100 and 300 are assigned the same labels in FIG. 3 and function as described above. The ePCFs 101 in the eHRPD network are coupled to one or more Base Transceiver Station (BTS) or cell site 201. The BTS 301 provides the air interface connection to the subscribers' UEs.

In network 300, LTE/SAE nodes have been coupled to the eHRPD nodes to integrate 4G network architecture. The enhanced NodeB (eNodeB or eNb) 302, like BTS 301, provides the air interface connection to the subscribers' UEs. eNodeB 302 manages the radio path to the UE and hosts the physical radio establishment, radio link control, and medium access control functions. eNodeB 302 also encrypts and decrypts data toward the radio path and handles the radio resource admission and management.

MME 303 is responsible for managing the Non Access Stratum (NAS) control plane messages from/to the UE. In addition, MME 303 plays a role in selecting Serving Gateway (SGW) 304 for user plane traffic, coordinates handover in the LTE network, and establishes the necessary authentication and security procedures. SGW 304 is the endpoint of user plane connections from multiple eNodeBs. SGW 304 is an anchor for user plane connections in case of UE handover between different eNodeBs. PGW 103 is the converging point between the eHRPD and LTE networks.

PGW 103 also provides an interface between the Evolved Packet Core (EPC) and external PDN networks such as the Internet. PGW 103 also provides an interface to Policy and Charging Rules Function (PCRF) node 305. PCRF 305 supports the creation of network and subscriber policy rules and automatically makes policy decisions for each subscriber active on the network, such as availability of services, quality of service (QoS) levels, and charging rules. PGW 103 further provides access to other services, such as the network operator's services 306, 3GPP Authentication, and Authorization and Accounting (AAA) Server.

To support and optimize handover between eHRPD and LTE network elements, additional interfaces are added to the network. Interface S103 connects HSGW 102 and SGW 304, and interface S101 connects eAN/ePCF 101 and MME 303.

In addition to monitoring probes 104, which monitor the eHRPD network interfaces, one or more monitoring probe 309 may be used to monitor the interfaces in the LTE network and the interfaces interconnecting the eHRPD and LTE networks. Monitoring probe 309 operates in the same way as probes 104 and is coupled to central monitoring server 105.

S101 Interface

The S101 interface is used to carry signaling information that assists in executing dormant and active handoffs of UEs between the LTE and eHRPD networks. The S101 interface also supports pre-registration, which helps to minimize service interruption time by allowing the target node to pre-register before the UE leaves the source access system. If conditions subsequently warrant that a handoff should occur, the handover signaling is also performed on the S101 interface.

The S101 messages contain a S101 Session ID that is used to identify the UE's context on both the LTE side and the eHRPD side. This Session ID parameter contains the IMSI value.

In case of optimized active handover from LTE to eHRPD, the PGW IP address, PGW GRE Key, and the APN are included in the S101 Direct Transfer message (from MME 103 to ePCF 101) for each PDN connection that is being handed off. This triggers an A11 Registration Request/A11 Registration Reply exchange between the ePCF and the selected HSGW. The A11 Registration Reply can contain the S103 HSGW IP address and the S103 Target HSGW's GRE Key for indirect data forwarding. The ePCF sends back the S103 HSGW IP address and the S103 target HSGW GRE Key in the S101 Direct Transfer message (from the ePCF to the MME). By correlation between the S101 Direct Transfers, the HSGW's S103 IP address in the A11 Registration Reply message, and the Target HSGW's GRE Key+IP address in the S101 Direct Transfer message to the MME, it is possible to arrive at the S101 and S103 logical links. At the same time, it is possible to merge the ePCF node generating the A11 signaling with that generating the S101 signaling.

S103 Interface

The S103 interface is used for DL data forwarding during mobility between HSGW and SGW. With the scheme mentioned above for detecting the S101 interface, the S103 logical links will also be detected and merged with the respective HSGW and SGW.

Correlating session records between A10/A11 and S2a interfaces

The A11 protocol includes several Request/Reply procedures such as the: A11 Registration Request/Reply messages discussed above. The A11 Registration Request/Reply procedure is used to establish the main A10 connection and the auxiliary A10 connections. The media bearers are established over these connections. The A11 Registration Update/Registration Acknowledge procedure is used to release all of the A10 connections for one UE or evolved Access Terminal (eAT). The A11 Session Update/Session Update Acknowledge procedure is used to make changes to a session for a specific A10 connection. The Mobile Node identifier (MN-ID) information element is present in all of these messages and carries the IMSI for the UE or eAT.

The S2a interface is between the HSGW and PGW, which function as the MAG and LMA, respectively, in the PMIPv6 architecture. The typical procedures on the S2a interface include the PBU/PBA (PMIPv6 Proxy Binding Update/Proxy Binding Acknowledgement) procedure and the BRI/BRA (PMIPv6 Binding Revocation Indication/Binding Revocation Acknowledgement) procedure. On the S2a interface, the Mobile Node Identifier information element of the PBA carries the IMSI. This information element is coded as a Nature of Address Indicator (NAI) parameter, according to 3GPP 23.003. For example, the NAI can look like this: "6<IMSI>@nai.epc.mnc<MNC>.mcc<MCC>.3gppnetwork.org" Hence, it is possible to extract the IMSI from the NAI in the S2a messages, and the IMSI can be used to correlate back to the A11 signaling. Using the IMSI, session or call records on the A11 interface can be correlated and combined with session or call records on the S2a interface.

However, the use of IMSI as discussed above approach will not work in all provider networks. This is because the Universal Integrated Circuit Card (UICC) that is used in the UE has dual IMSIs—one IMSI is an LTE IMSI and the other is an eHRPD IMSI. As a result, the IMSI observed on the A11 interface is the eHRPD IMSI, while the IMSI observed on the S2a interface is the LTE IMSI. The HSGW maintains a mapping of both IMSIs that allows the HSGW to swap the IMSIs and use the appropriate one on each interface. However, this mapping is not available to the monitoring probes. This creates a problem for the monitoring system because, without knowing the IMSI mapping, it is not possible to do multi-protocol correlation between the A11 and S2a interfaces. However, using the scheme described below, the monitoring probes can address this scenario even when the IMSIs are different.

Correlating Session Records between A10 and S2a interfaces.

The monitoring system can use VSNCP monitoring to correlate data from multiple protocols. On the S2a interface, the PDN address and Link Local Address information elements are extracted from the S2a signaling. The PDN address is dynamically or statically assigned to the UE, but only dynamic PDN Address allocation (PAA) is considered in this embodiment. A different embodiment can consider the static PAA in a manner similar to the dynamic PAA. The PDN address may be included in two forms: the IPv6 HNP option (Home Network Prefix option), including the Interface Identifier (IID) or the IPv4 Home Address, depending if IPv6 or IPv4 is used respectively. The IID is obtained from the lowest 8 bytes of the Home Network Prefix option in the IPv6 scenario.

The VSNCP protocol can be monitored on the A10 interface and is used between the UE and the HSGW to initiate, configure and terminate a PDN connection on eHRPD. The VSNCP procedures are:
 Configure Request
 Configure Ack
 Configure Nack
 Configure Reject
 Terminate Request
 These messages carry the following IE's that are of interest
 PDN Identifier
 APN
 PDN address (IID only for IPv6)

In case of IPv6, the PDN address carries the IID value of the IPv6 PDN address, and in case of IPv4 it carries the entire IPv4 PDN address. For IPv6, the PDN address=IID+HNP. The IID value by itself does not uniquely identify the PDN address allocated to the UE. The IID value combined with the HNP identifies the PDN address assigned to the UE as seen on S2a interface.

The HNP is sent on A10 in the ICMPv6 Router Advertisement message. By monitoring this message and correlating back to the VSNCP message for the IID, the entire PDN address that was assigned to the UE can be determined. The concatenation of HNP+IID is equal to the PMIPv6 HNP value monitored previously on S2a. FIG. 4 describes the stack for ICMPv6 present in A10.

Based on these HNP addresses, it is possible to perform A10/S2a multiple protocol correlation without relying on the IMSI.

FIG. 5 illustrates a call flow representing an IPv6 allocation. A monitoring probe 500 may capture the messages exchanged in the call flow from the A10/A11 and/or the S2a interfaces. Monitoring probe 500 may monitor additional interfaces from which it may capture these and other messages. In step 501, the UE is authenticated and attached to the eHRPD access network (eAN). VSNCP Configuration-Request message 502 is sent from the UE to the HSGW. The HSGW then sends PBU message 503 to the PGW, which updates the HSS/AAA in step 504.

The PGW sends PBA message 505 back to the HSGW. PBA message 505 includes the IPv6 HNP and IID, which may be captured by monitoring probe 500 on the S2a interface. The HSGW then sends VSNCP Configuration-Ack message 506, which includes a PDN Address corresponding to the IPv6 IID. Monitoring probe 500 captures message 506 from A10 and correlates the IID values with messages captured from the S2a interface.

The HSGW sends VSNCP Configuration-Request message 507 to complete the procedure. Message 507 includes the PDN-ID configuration option. The UE responds to message 507 with VSNCP Configuration-Ack message 508 containing the PDN-ID configuration option. The UE sends Router Solicitation message 509 to the HSGW. Upon receiving the Router Solicitation message, the HSGW sends Router Advertisement message 510, which includes the IPv6 Home Network Prefix. In step 511, the UE generates an IPv6 global unicast address via IPv6 stateless address auto-configuration, using the HNP and IID received in step 6 and step 10.

FIG. 6 is a flowchart illustrating IPv4 address allocation during PDN connection establishment. Monitoring probe 600 monitors the A10/A11 and S2a interfaces and captures the messages passed on these interfaces. In step 601, the UE is authenticated and attached to the eHRPD access network. The UE sends VSNCP Configuration-Request message 602 over the main signaling connection to HSGW. The HSGW selects a PGW and sends PBU message 603 to the PGW. In step 604, the PGW updates the AAA Server/HSS with the PGW's identity or IP address.

The PGW sends PBA message 605 to the HSGW with the IPv4 Default Router Address option. The HSGW sends VSNCP Configuration-Ack message 606 to the UE that includes the PDN address IE containing the IPv4 Home Address allocated with the PBA 605.

Based on the above-illustrated call flow and procedures, it is possible to correlate session records belonging to A10 and S2a interfaces for the same UE without using the IMSI.

Correlation of A11 and A10 Interfaces

FIG. 7 illustrates the A10 stacks for the Main Service Connection 701 and the Auxiliary Service Connections 702. The A10 stacks support GRE tunnels using GRE Keys 703. The IMSI may not be always present in A10 traffic. The HSGW and ePCF establish one Main Service Connection on A10 followed by multiple Auxiliary Connections for each UE that requests a session. A separate GRE tunnel is established for each connection (Main and Auxiliary). Each A10 packet in the tunnel is identified with a GRE Key. The value of the GRE Key for the tunnel is present in the Session Specific Extension information element of the A11 Registration Request message when the main A10 connection is setup. For each Auxiliary Connection a dedicated GRE Keys is present in the Additional Session Info section of the Normal Vendor/Organization Specific Extension of the A11 Registration Request message. Using the GRE Key tracking scheme as described above, it is possible to bind each A10 packet to A11 signaling.

Monitoring System

In a complex system such as an eHRPD/LTE network, the tasks of measuring network performance, troubleshooting network operation, and controlling network service behavior can be very difficult for the network operator. Evolution of the network, such as the introduction and deployment of new network technology, causes additional instability and further problems in network measurement, troubleshooting and control. In order to perform these tasks, network operators often make use of external monitoring systems, such as monitoring probes 104, 309, 500 and 600 and monitoring server or controller 105. These monitoring probes are typically connected to the network in a non-intrusive mode that allows them to sniff data from the network interfaces, process the data, and provide measurements and reports that help the network operator to manage its network.

The monitoring system may be coupled to links in the network via one or more probes to passively monitor and collect signaling data from one or more interfaces in the network. The monitoring system may collect user plane and control plane data from the interfaces. It will be understood that some or all of the other interfaces or links in the network may also be monitored by the monitoring system. The monitoring system may comprise, in one embodiment, one or more processors running one or more software applications that collect, correlate and analyze Protocol Data Units (PDU) and data packets from network interfaces and nodes.

A service provider or network operator may access data from the monitoring system via user interface station 106. The monitoring system may further comprise internal or external memory 107 for storing captured data packets, user session data, call records configuration information, and software application instructions.

The monitoring system may incorporate protocol analyzer, session analyzer, and/or traffic analyzer functionality that provides OSI (Open Systems Interconnection) layer 2 to layer 7 troubleshooting by characterizing IP traffic by links, nodes, applications and servers on the network. Such functionality is provided, for example, by the GeoProbe G10 platform, including the Iris Analyzer Toolset applications and Spl-probes, from Tektronix Incorporated. It will be understood that the monitoring systems illustrated in FIGS. 1 and 2 are simplified and that any number of interconnected monitoring system probes may be coupled to one or more interfaces within the networks. A single monitoring probe may capture data from a particular interface, or two or more probes may be coupled to one interface.

The monitoring systems may be coupled to network interfaces via packet capture devices, such as high-speed, high-density probes that are optimized to handle high bandwidth IP traffic. The monitoring system passively captures message traffic from the interfaces without interrupting the network's operation. The monitoring system may capture and correlate the packets associated with specific data sessions on network interfaces. The related packets can be combined into a record for a particular flow, session or call on the network. In an alternative embodiment, the monitoring system may be an active component, such as a software agent, that resides on a network node, for example, and that captures data packets passing into or out of the node.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A network monitoring system comprising:
one or more passive monitoring probes coupled to network interfaces, the probes capable of capturing data packets from the network interfaces, the data packets associated with messages exchanged between network nodes; and
a processor receiving the captured data packets from the probes, the processor operating to:
identify a plurality of A11 Registration Request messages;
for each A11 Registration Request message, associate an address element with an existing ePCF (evolved Packet Control Function) node, if the address element is known, or with a new ePCF node, if the address is not known;
identify a plurality of A11 Registration Reply messages;
for each A11 Registration Reply message, associate an address element with an existing A11 HSGW (High Rate Packet Data (HRPD) Serving Gateway) node, if the address element is known, or with a new A11 HSGW node, if the address element is not known;
identify an intra-HSGW handoff in A11 Registration Request messages having a mobility event indicator and not having HSGW H1 (Control Plane Interface) address information;
correlate a source path and a target path for A11 interfaces using IMSI (International Mobile Subscriber Identity) information; and
bind HSGW IP (Internet Protocol) addresses of the source and target paths to a single HSGW node entity.

2. The monitoring system of claim 1, wherein the processor is further operable to:
identify an H1 interface address from an A11 registration reply message; and
associate the H1 interface address with an A11 HSGW node.

3. The monitoring system of claim 1, wherein the processor is further operable to:
identify GRE (Generic Routing Encapsulation) Keys within a the Session Specific Extension information or Normal Vendor/Organization Specific Extension (NVSE) in the A11 messages; and
associate the GRE keys with endpoints of an A10 interface.

4. The monitoring system of claim 1, wherein the processor is further operable to:
identify an HSGW address within an A13 Session Information Response message; and associate the HSGW address with a known A11 HSGW node.

5. The monitoring system of claim 1, wherein the processor is further operable to:
identify an A24 connection identification element within an A13 Session Information Request message;
identify an RLP_ID (Radio Link Protocol Identifier) element from an A13 Session Information Response message;
creating an A24 GRE Key by appending the RLP_ID element to the A24 connection identification element; and
correlate an A13 address for an ePCF node with an A24 interface address using the A24 GRE Key.

6. The monitoring system of claim 1, wherein the processor is further operable to:
identify an S2a source address in a Proxy Binding Update (PBU) message;
associate the PBU source address with an existing S2a HSGW node, if the PBU source address is known, or with a new S2a HSGW node, if the PBU source address is not known;
identify an S2a source address in a proxy binding acknowledgement (PBA) message; and
associate the PBA source address with an existing PGW (Packet Data Network (PDN) Gateway) node, if the PBA source address is known, or with a new PGW node, if the PBA source address is not known.

7. The monitoring system of claim 6, wherein the processor is further operable to:
identify a PDN (Packet Data Network) address in the PBA message;
associate the PDN address with an existing S2a HSGW node;
identify the PDN address in an A10 message;
associate the PDN address with an existing A11 HSGW node; and
combine the existing S2a HSGW node and the existing A11 HSGW node into a single HSGW node by associating the PDN Address.

8. The monitoring system of claim 1, wherein the processor is further operable to:
correlate a S103 Target HSGW GRE Key and IP address elements in S101 Direct Transfer messages and on A11 Registration messages identify an S101 interface and an S103 interface.

9. A network monitoring system comprising:
one or more passive monitoring probes coupled to network interfaces, the probes capable of capturing data packets from the network interfaces, the data packets associated with messages exchanged between network nodes; and
a processor receiving the captured data packets from the probes, the processor operating to:
create a S2a session record for messages captured on an S2a interface;
identify an PMIPv6 (Proxy Mobile Internet Protocol Version Six) Proxy Binding Acknowledgement (PBA) message associated with the S2a session record;
identify, in the PBA message, either an S2a IPv6 HNP (Home Network Prefix) option that includes an IID (Interface Identifier) or an IPv4 Home Address;
create an A10 session record for messages captured on an A10 interface;
identify an IID or PDN (Packet Data Network) Address in a vendor-specific network control protocol (VSNCP) message that is associated with the A10 session record;
identify a HNP for an IPv6 (Internet Protocol Version Six) case in an ICMPv6 (Internet Control Message Protocol Version Six) Router Advertisement Message that is associated with the A10 session record; and
correlate the A10 session record to the S2a session record using the HNP and IID data or the PDN Address.

10. The monitoring system of claim 9, wherein the HNP and IID data is used when messages are IPv6, and wherein the PDN Address is used when messages are IPv4 (Internet Protocol Version Four).

11. The monitoring system of claim 9, wherein the processor is further operable to:
combine the correlated A10 session record and S2a session record into a single session record.

12. The monitoring system of claim 9, wherein the processor is further operable to:
identify a first GRE (Generic Routing Encapsulation) Key in an A11 registration request message associated with the A11 session record;
create an A10 session record for messages captured on the A10 interface;
identify further GRE Keys associated with the A10 session record; and
correlate these further GRE Keys to the first GRE Key.

13. The monitoring system of claim 12, wherein the processor is further operable to:
combine the correlated A11 session record and S2a session record into a single session record; and
combine the A10 session record with the single session record.

14. A non-transitory computer-readable storage medium comprising instructions for controlling a monitoring system to identify a network topology based upon data packets captured from network interfaces, wherein the instructions, when executed, cause a processor to perform actions comprising:
create an S2a session record for messages captured on an S2a interface;
identify an PMIPv6 (Proxy Mobile Internet Protocol Version Six) Proxy Binding Acknowledgement (PBA) message associated with the S2a session record;
identify an S2a IPv6 (Internet Protocol Version Six) Home Network Prefix (HNP) option that includes an IID (Interface Identifier) in the PBA message;
create an A10 session record for messages captured on an A10 interface;
identify an A10 HNP (Home Network Protocol) for a IPv6 case in a router advertisement message associated with the A10 session record;
identify an IID in a Vendor-Specific Network Control Protocol (VSNCP) message that is associated with the A10 session record; and
correlate the A10 session record to the S2a session record using the HNP and IID data.

15. The non-transitory computer-readable storage medium of claim 14, wherein the instructions, when executed, further cause a processor to perform actions comprising:
combining the correlated A10 session record and S2a session record into a single session record.

16. A non-transitory computer-readable storage medium comprising instructions for controlling a monitoring system to identify a network topology based upon data packets captured from network interfaces, wherein the instructions, when executed, cause a processor to perform actions comprising:
create a S2a session record for messages captured on an S2a interface;
identify an PMIPv6 (Proxy Mobile Internet Protocol Version Six) Proxy Binding Acknowledgement (PBA) message associated with the S2a session record;

identify an IPv4 (Internet Protocol Version Four) Home Address in the PBA message;

create an A10 session record for messages captured on an A10 interface;

identify a PDN (Packet Data Network) Address in a Vendor-Specific Network Control Protocol (VSNCP) message that is associated with the A10 session record; and correlate the A10 session record to the S2a session record using the PDN Address.

17. The non-transitory computer-readable storage medium of claim 16, wherein the instructions, when executed, further cause a processor to perform actions comprising:

combining the correlated A10 session record and S2a session record into a single session record.

* * * * *

UNITED STATES PATENT AND TRADEMARK OFFICE
CERTIFICATE OF CORRECTION

PATENT NO.       : 8,477,621 B2
APPLICATION NO.  : 13/114934
DATED            : July 2, 2013
INVENTOR(S)      : Vignesh Janakiraman et al.

It is certified that error appears in the above-identified patent and that said Letters Patent is hereby corrected as shown below:

Title Page, Item (73) Assignee "Tektronic, Inc." should be changed to -- Tektronix, Inc. --.

Signed and Sealed this
Twentieth Day of August, 2013

Teresa Stanek Rea
*Acting Director of the United States Patent and Trademark Office*